United States Patent [19]
Kaganoi

[11] Patent Number: 5,953,315
[45] Date of Patent: Sep. 14, 1999

[54] ATM CELL SENDING SYSTEM

[75] Inventor: Teruo Kaganoi, Tokyo, Japan

[73] Assignee: NEC Corporation, Tokyo, Japan

[21] Appl. No.: 08/748,515

[22] Filed: Nov. 8, 1996

[30] Foreign Application Priority Data

Nov. 15, 1995 [JP] Japan ................................ 7-295872

[51] Int. Cl.[6] .............................................. H04L 12/56
[52] U.S. Cl. ...................... 370/230; 370/392; 370/398; 711/108
[58] Field of Search .................... 370/229, 230, 370/231, 235, 392, 395, 398, 399, 412, 415, 419, 428, 429; 710/3, 4, 23, 26, 28; 711/100, 101, 108

[56] References Cited

U.S. PATENT DOCUMENTS

| | | | |
|---|---|---|---|
| 5,381,407 | 1/1995 | Chao | 370/233 |
| 5,467,349 | 11/1995 | Huey et al. | 370/397 |
| 5,513,134 | 4/1996 | Cooperman et al. | 365/49 |
| 5,530,698 | 6/1996 | Kozaki et al. | 370/399 |
| 5,535,197 | 7/1996 | Cotton | 370/395 |
| 5,581,550 | 12/1996 | Boyer et al. | 370/395 |

FOREIGN PATENT DOCUMENTS 0632622  1/1995  European Pat. Off. .
5-252185  9/1993  Japan .

OTHER PUBLICATIONS

H. Jonathan Chao, "Design of Leaky Bucket Access Control Schemes in ATM Networks", *IEEE ICCC '91*, Mar. 1991, pp. 180–187.

*Primary Examiner*—Alpus H. Hsu
*Attorney, Agent, or Firm*—Sughrue, Mion, Zinn, Macpeak & Seas, PLLC

[57] ABSTRACT

An ATM cell sending system includes a first memory, a second memory, a retrieval circuit, and a memory control circuit. The first memory temporarily stores an input cell, outputs a cell storage address, and, in response to input of the cell storage address, outputs the cell stored at the input cell storage address. The second memory stores the cell storage address from the first memory and outputs the readout cell storage address to the first memory. The retrieval circuit uses an address corresponding to a reservation time for cell sending as a start address to retrieve a first free address after the reservation time from the second memory. The memory control circuit writes the cell storage address of the first memory at the free address of the second memory, which is retrieved by the retrieval circuit, and reads out the cell storage address of the first memory from an address of the second memory which corresponds to a current time.

7 Claims, 7 Drawing Sheets

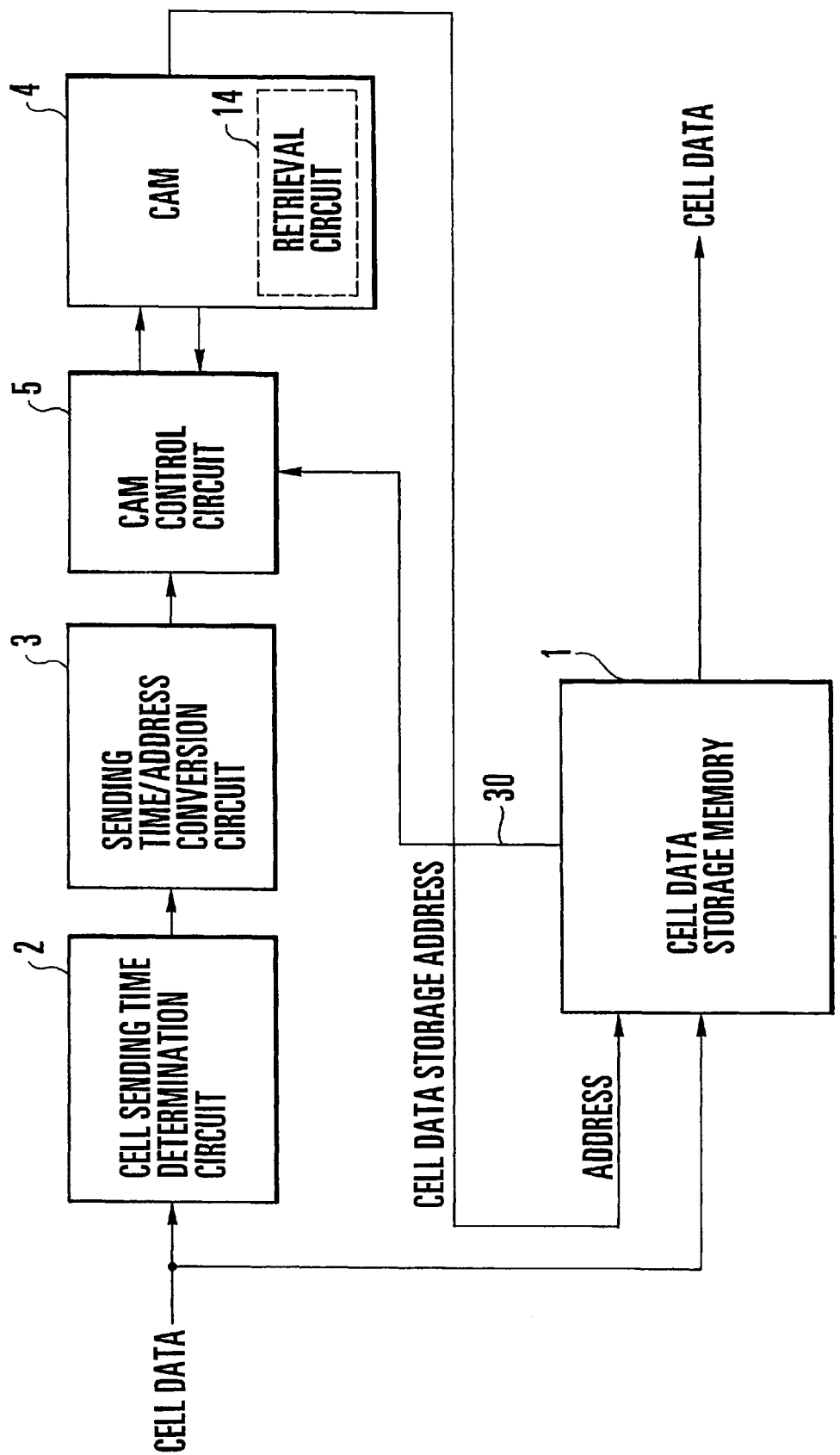
F I G. 1

ATM CELL SENDING SYSTEM

BACKGROUND OF THE INVENTION

The present invention relates to an ATM (Asynchronous Transfer Mode) cell sending system and, more particularly, to an ATM cell sending system in a traffic shaper for controlling the flow of cells on the basis of defined information associated with a cell traffic.

Generally, a traffic shaper is arranged in a cell sending unit for sending cells to a line, or a cell relay unit for relaying cells. The traffic shaper adjusts the cell sending interval by reserving a cell sending time in advance. A technique for determining a cell sending time is important for a traffic shaper.

As shown in FIG. 6, a conventional circuit for determining a cell sending time comprises a sending time determination circuit 11 for determining an ideal cell sending time and a cell sendable time determination circuit 12 for finding a time after the determined ideal cell sending time when a cell can be sent.

The sending time determination circuit 11 outputs, on the basis of an input cell 110, an ideal sending time 111 which is an ideal time for sending the cell to a line.

The cell sendable time determination circuit 12 comprises a selector 121 for selectively sending the ideal sending time 111 or an output from an adder 123, a sendability determination unit 122 for checking whether a sending reservation is present for a time determined by the selector 121, and the adder 123 for incrementing the time by one when a sending reservation has already been made.

In this arrangement, the ideal sending time 111 output from the sending time determination circuit 11 is input to the cell sendable time determination circuit 12. The sendability determination unit 122 checks whether a sending reservation is present for the ideal sending time 111. If no reservation is present, the sendability determination unit 122 reserves that time for cell sending.

If a reservation has already been made for the time, the sending time is incremented by one by the adder 123. The incremented time is input to the sendability determination unit 122 again through the selector 121. The sendability determination unit 122 checks whether a sending reservation is present for the incremented time. The above operation is repeated until a time having no reservation is detected.

The sending time determination circuit 11 procedure for determining the ideal sending time will be described below with reference to the flow chart in FIG. 7.

Referring to FIG. 7, an ideal sending time TOT is set equal to a cell delay fluctuation τ1 (step S61).

When a cell has arrived, a cell arrive time TA is set to the arrival time of the cell (step S62), and the ideal sending time TOT is compared with the cell arrival time ta (step S63). If, in step S63, the ideal sending time TOT is later than the cell arrival time ta, a cell sending time t0 is set to the ideal sending time TOT (step S65).

If, in step S63, the ideal sending time TOT is earlier than the cell arrival time ta, the cell sending time t0 is set to the cell arrival time ta (step S64). If, in step S66, the ideal sending time TOT is earlier than the cell arrival time considering the cell delay fluctuation (ta-τ1), the ideal sending time TOT is set to the time (ta-τ1) (step S67).

In, in step S66, the ideal sending time TOT is later than the cell arrival time considering the cell delay fluctuation (ta-τ1), the cell sending time t0 is kept set to the cell arrival time ta.

Next, a new ideal sending time TOT is set by adding a maximum cell sending time interval T to the ideal sending time TOT (step S68). Finally, after queuing, the cell is sent at the cell sending time t0 (step S69). The flow returns to step S62, and this process is repeated for all arriving cells.

The above-described conventional sending time determination circuit 11 determines the ideal cell sending time, and thereafter, the sendability determination unit 122 checks whether a sending reservation for another cell is present for the time. If there is no reservation, a cell sending reservation can be set for that time. However, if a reservation has already been made, a reservation for a cell sending time after the ideal cell sending time is checked. If a reservation has already been made for that time, too, the next cell sending time is checked. In this manner, the time required to determine the cell sending time becomes long.

Unless a time without any reservation is found, the cell sending time cannot be determined within one cell time which is necessary for sending one cell.

Japanese Patent Laid-Open No. 5-252185 discloses a technique for ensuring a free area of a cell storage memory and cannot solve the above problem.

SUMMARY OF THE INVENTION

It is an object of the present invention to provide an ATM cell sending system capable of determining a cell sending time quickly.

In order to achieve the above object, according to the present invention, there is provided an ATM cell sending system comprising: a first memory for temporarily storing an input cell, outputting a cell storage address, and outputting the cell stored at an input cell storage address; a second memory for storing a cell storage address from the first memory and outputting a cell storage address to the first memory; retrieval means for retrieving from the second memory a first free address of the second memory after an address corresponding to an idea cell sending time; and memory control means for writing the cell storage address of the first memory at a free address of the second memory, which is retrieved by the retrieval means, and outputting the cell storage address of the first memory from an address of the second memory which corresponds to a current time.

BRIEF DESCRIPTION OF THE DRAWINGS

FIG. 1 is a block diagram showing the arrangement of an ATM cell sending system according to an embodiment of the present invention;

DESCRIPTION OF THE PREFERRED EMBODIMENT

Figure 2:
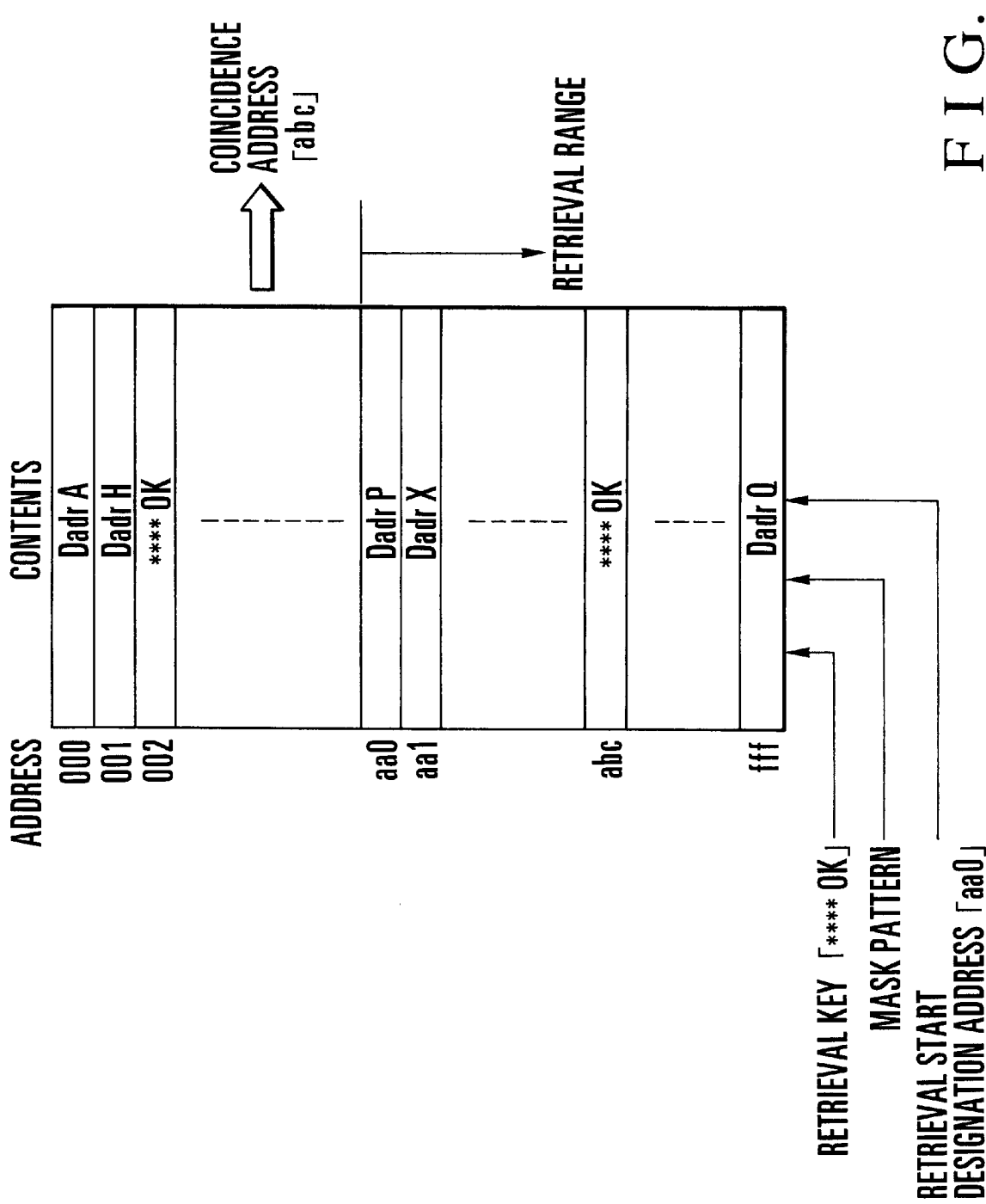
FIG. 2 is a view showing a data format in a CAM shown in FIG. 1.

The embodiment of the present invention will be described below with reference to the accompanying drawings.

FIG. 1 shows the arrangement of the ATM cell sending system according to an embodiment of the present invention. The ATM cell sending system of this embodiment comprises a cell data storage memory 1 for holding the contents of an arriving cell, and a contents addressable memory (CAM) 4 for storing addresses of the cell data storage memory 1 representing cell sending reservations or reservable patterns representing available cell sending times in which the respective address of the CAM 4 correspond to a ascending cell sending times. The CAM 4 has a retrieval circuit 14 (to be described later).

The ATM cell sending system of this embodiment also comprises: a cell sending time determination circuit 2 for calculating an ideal sending time for an arrival cell; a sending time/address conversion circuit 3 for converting the ideal sending time calculated by the cell sending time determination circuit 2 into a corresponding address of the CAM 4; and a CAM control circuit 5 for controlling write access to register in the CAM 4, the address of the cell data storage memory 1 at which the cell data is written and a CAM control circuit 5 for controlling write access, read access, and retrieval of the CAM 4. Note that cells arrive one by one, and processing is completed within one cell time.

With this arrangement, when a cell arrives, the contents of the cell are written to an address of the cell data storage memory 1. This address is used when a cell sending reservation is set in the CAM 4, and more specifically, used as data to be written at a retrieved free address of the CAM 4.

Figure 7:
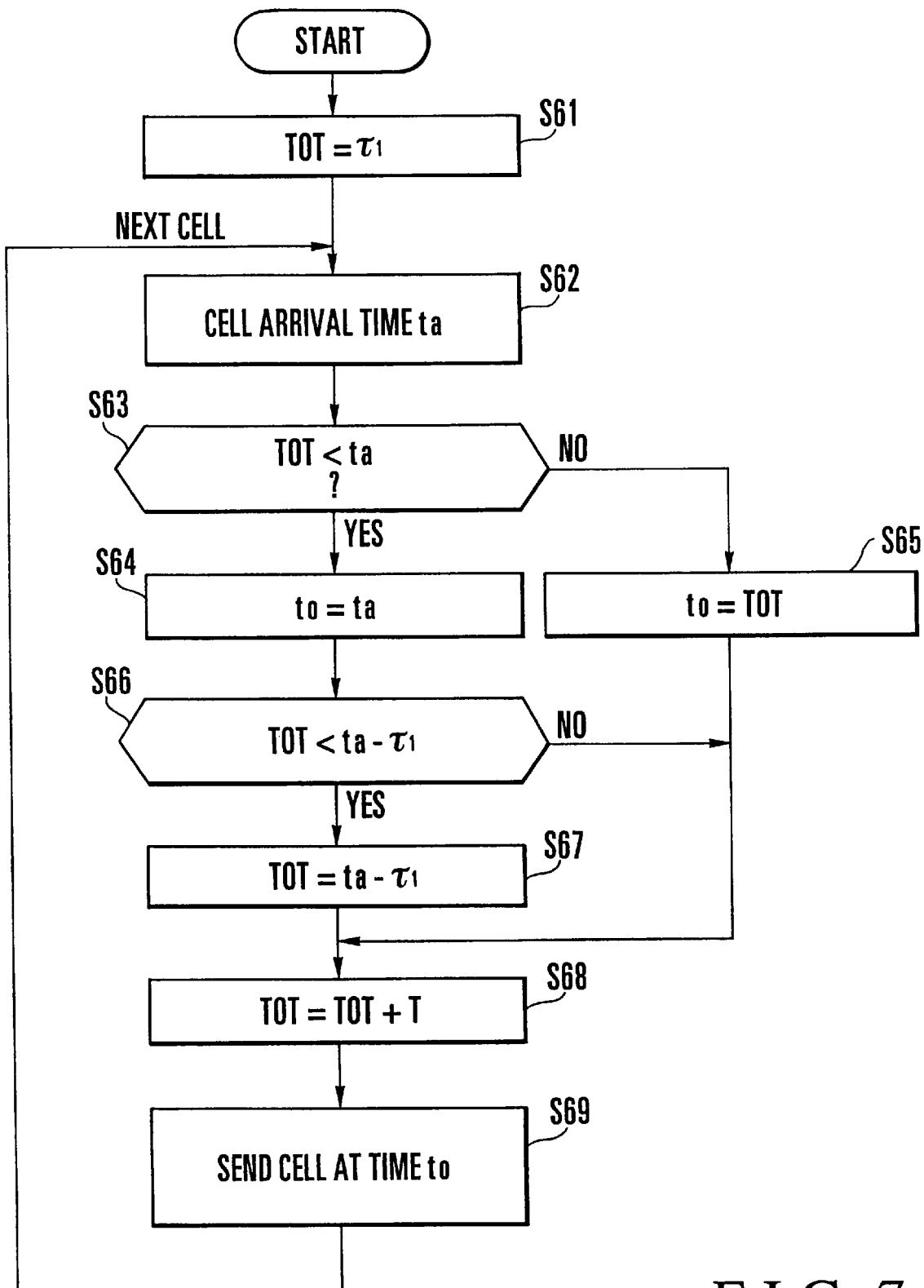
FIG. 7 is a flow chart of ideal cell sending time determination processing.

An ideal cell sending time for the arriving cell is calculated by the cell sending time determination circuit 2 to determine the time for sending the cell. The ideal cell sending time is determined in accordance with the same procedure as in the prior art (FIG. 7).

The sending time/address conversion circuit 3 converts the ideal cell sending time determined by the cell sending time determination circuit 2 into a corresponding address of the CAM 4. The CAM control circuit 5 sets the CAM 4 in a retrieval mode and starts the retrieval circuit 14. Starting from the address received from the sending time/address conversion circuit 3, the retrieval circuit 14 retrieves a first available address of the CAM 4 at which a cell sending reservation can be made. The retrieval key for this retrieval is a cell sending reservable pattern (to be described later).

When a free address at which a reservation can be made is found by the retrieval circuit 14, the CAM control circuit 5 sets the CAM 4 in a write mode and makes a cell sending reservation at the free address. More specifically an address 30 of the cell data storage memory 1 at which the cell data has been written is written at the retrieved free address, thereby making a cell sending reservation. Cell sending is performed once in a cell time when the CAM control circuit 5 sets the CAM 4 in a read mode to read out the data at the address of the CAM 4 corresponding to a sending time. The data read out from the CAM 4 is the address of the cell in the cell data storage memory 1. When the readout data is used as an address, the cell is output from the cell storage memory 1.

The CAM control circuit 5 writes a cell sending reservable pattern to represent a free address of the CAM 4. When the address 30 at which the cell data is stored is output from the cell data storage memory 1, the retrieval circuit 14 retrieves a free address of the CAM 4 by searching for the cell sending reservable pattern.

After the cell is read out from the cell data storage memory 1, the CAM control circuit 5 increments the address of the CAM 4 by one, which is the next read target, in correspondence with the next sending time. By incrementing the address, the cell storage data is sequentially read out from the CAM 4.

FIG. 2 shows the data format in the CAM 4.

The respective addresses of the CAM 4 correspond to cell sending times. When a cell sending reservation is made, an address of the cell data storage memory 1, at which cell data has been written, is written in the data field (data storage area) at an address of the CAM 4. When no cell sending reservation is present, a cell sending reservable pattern is written in the data field to denote that a sending reservation can be made.

In this embodiment, the CAM 4 has addresses "000" to "fff". Contents are stored at the respective addresses. In FIG. 2, address "DadrA" of the cell data storage memory 1 is stored at address "000" of the CAM 4; address "DadrH", at address "001"; address "DadrP", at address "aa0"; address "DadrX", at address "aa1"; and address "DadrQ", at address "fff" as contents. The contents are separately stored at the respective addresses of the CAM 4 so that ATM cell sending processing can be performed.

A cell sending reservable pattern "**OK" denoting that no cell sending reservation is present is stored at addresses "002" and "abc" of the CAM 4. when retrieval is performed using the pattern "**OK" as a retrieval key, free addresses can be detected.

In a general CAM in retrieval mode, all addresses are checked to determine whether a pattern coinciding with the retrieval key is present. In this embodiment, however, an address from which retrieval is started can correspond to the ideal cell sending time. Assume that retrieval is performed while setting address "aa0" as the retrieval start designation address and using the pattern "****OK" as the retrieval key. In this case, the retrieval key coincides with the contents at address "abc" first after address "aa0", so that "abc" is output as a free address. This address "abc" of the CAM 4 is sent to the CAM control circuit 5 as a read address, and the address of the cell data is stored at the read address.

In the retrieval mode, a mask pattern is used as needed.

Figure 3:
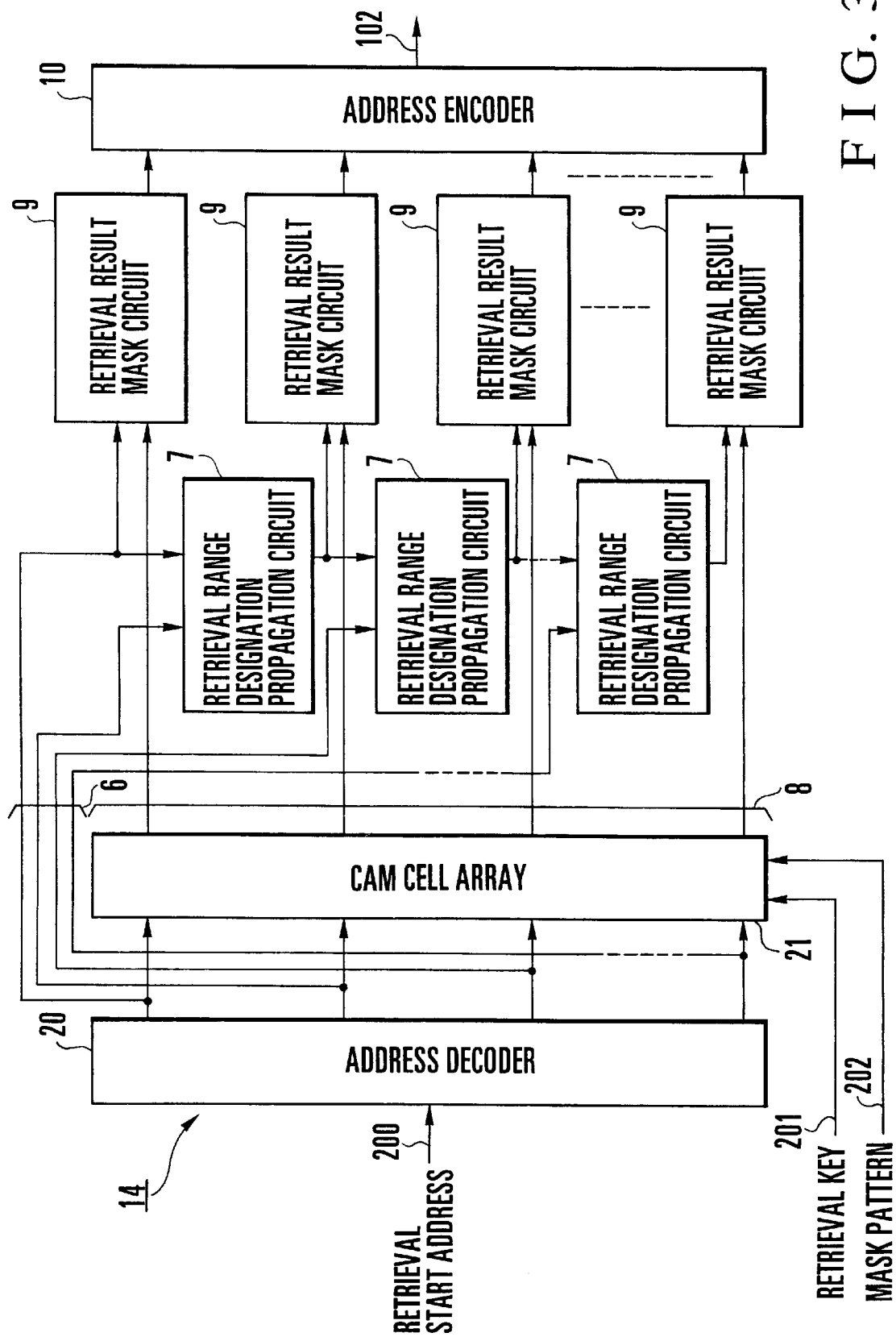
FIG. 3 is a circuit diagram showing the arrangement of a retrieval circuit shown in FIG. 1.

To realize the above retrieval operation, the retrieval circuit 14 of this system has an arrangement shown in FIG. 3. More specifically, the CAM 4 comprises: a CAM cell array 21 which stores the addresses of cell data, receives a retrieval key 201 and a mask pattern 202 from the CAM control circuit 5, and determines coincidence between the retrieval key 201, the mask pattern 202, and the contents of the memory devices; an address decoder 20 which decodes a retrieval start address 200 from the CAM control circuit 5; and an address encoder 10 which outputs an address as a retrieval result.

The retrieval circuit 14 also comprises retrieval result mask circuits 9 arranged to correspond to the inputs to the address encoder 10, and retrieval range designation propagation circuits 7 provided on the input sides of the respective retrieval result mask circuits 9. The retrieval range designation propagation circuits 7 are cascade-connected, each of which receives an output from the preceding circuit through one input terminal.

With this arrangement, when the retrieval start address 200 is input to the address decoder 20, and the retrieval key 201 and the mask pattern 202 are input to the CAM cell array 21, a retrieval operation is performed in the following manner.

The retrieval start address 200 is decoded by the address decoder 20 and input to the CAM cell array 21. The CAM cell array 21 performs the retrieval operation using the retrieval key 201 and the mask pattern 202 and sets a flag to the output line of an address of the CAM cell array 21, which has contents coinciding with the retrieval key, i.e., an address retrieval result 8.

The retrieval start address 200 is decoded by the address decoder 20 and also input to each retrieval range designation propagation circuit 7 through an address designation line 6. An output from each retrieval range designation propagation circuit 7 is input to the corresponding retrieval result mask circuit 9 together with the address retrieval result 8. Of the address designation lines 6 for transmitting outputs from the address decoder 20, only an address designation line corresponding to the designated address goes active. Outputs from the retrieval range designation propagation circuits 7 subsequent to a circuit connected to the designation line in the active state sequentially become active. The outputs from the retrieval range designation propagation circuits 7 are input to the retrieval result mask circuits 9.

Consequently, on the basis of the address retrieval results 8 and the address designation lines 6, only the retrieval results of addresses after the designated address (all addresses from the designated address to the maximum address) become active. These retrieval results correspond to outputs from the retrieval result mask circuits 9. On the basis of the outputs from the retrieval result mask circuits 9, the address encoder 10 outputs an address 102 having contents coinciding with the retrieval key and is the first free address after the retrieval start address.

Figure 4:
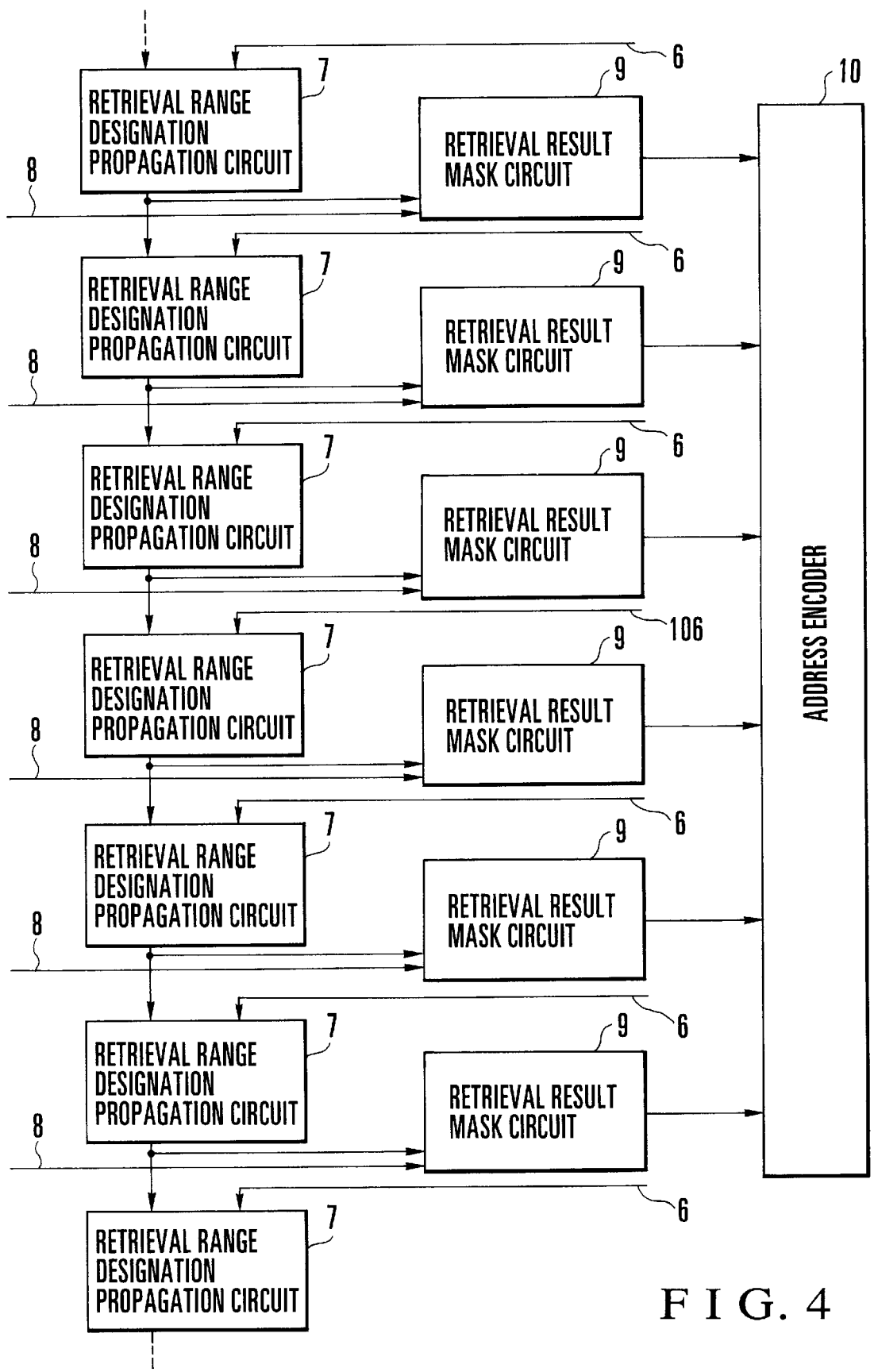
FIG. 4 is a view showing the operations of retrieval range designation propagation circuits and retrieval result mask circuits shown in FIG. 3.

The operations of the retrieval range designation propagation circuits 7 and the retrieval result mask circuits 9 will be described in more detail with reference to FIG. 4. Referring to FIG. 4, the retrieval circuit 14 comprises the retrieval range designation propagation circuits 7 each of which receives outputs from the address designation line 6 and the preceding circuit, and the retrieval result mask circuits 9 each of which receives the retrieval result 8, i.e., the result of retrieval of a memory device (not shown), and an output from the corresponding retrieval range designation propagation circuit 7.

The active state of the address designation line 6 is defined as "1", and "1" is set when the retrieval result 8 for an address represents a coincidence. In this case, an OR gate may be employed for the retrieval range designation propagation circuit 7, and an AND gate may be employed for the retrieval result mask circuit 9.

With this arrangement, an address for designating a retrieval start position is input in addition to the retrieval key and the mask pattern from the CAM control circuit 5 in the retrieval mode. The input address is decoded by the address decoder 20 (FIG. 3). In this embodiment, as the result of decoding, only an address designation line 106 of the address designation lines 6, which transmits the designated address, goes active (a flag set state) while other address designation lines do not go active.

When the address designation line 106 goes active, the active state sequentially propagates for addresses larger than the designated address through the retrieval range designation propagation circuits 7. The address retrieval result 8 represents, for each address, that the retrieval key coincides with the contents in the CAM cell array 21. The retrieval result 8 of each address and an output from the retrieval range designation propagation circuit 7 for each address are input to the corresponding retrieval result mask circuit 9. Only circuits of the retrieval results mask circuit 9, which receive inputs in an active state from the retrieval range designation propagation circuits 7 and the retrieval result 8 representing coincidence, produce active outputs.

The outputs from the retrieval result mask circuits 9 are input to the address encoder 10 in which the priority is defined in ascending order. The address encoder 10 encodes the smallest one of the addresses whose retrieval results represent coincidence. More specifically, the address encoder 10 outputs the coincidence address closest to the retrieval start address.

The address result of the address encoder 10 is input to the CAM control circuit 5, and the address of cell data is stored at this address. That is, to store the address of the cell data storage memory 1, an address of the CAM 4 where the contents coincide with the retrieval key at the first address after the retrieval start address, must be obtained.

Figure 5:
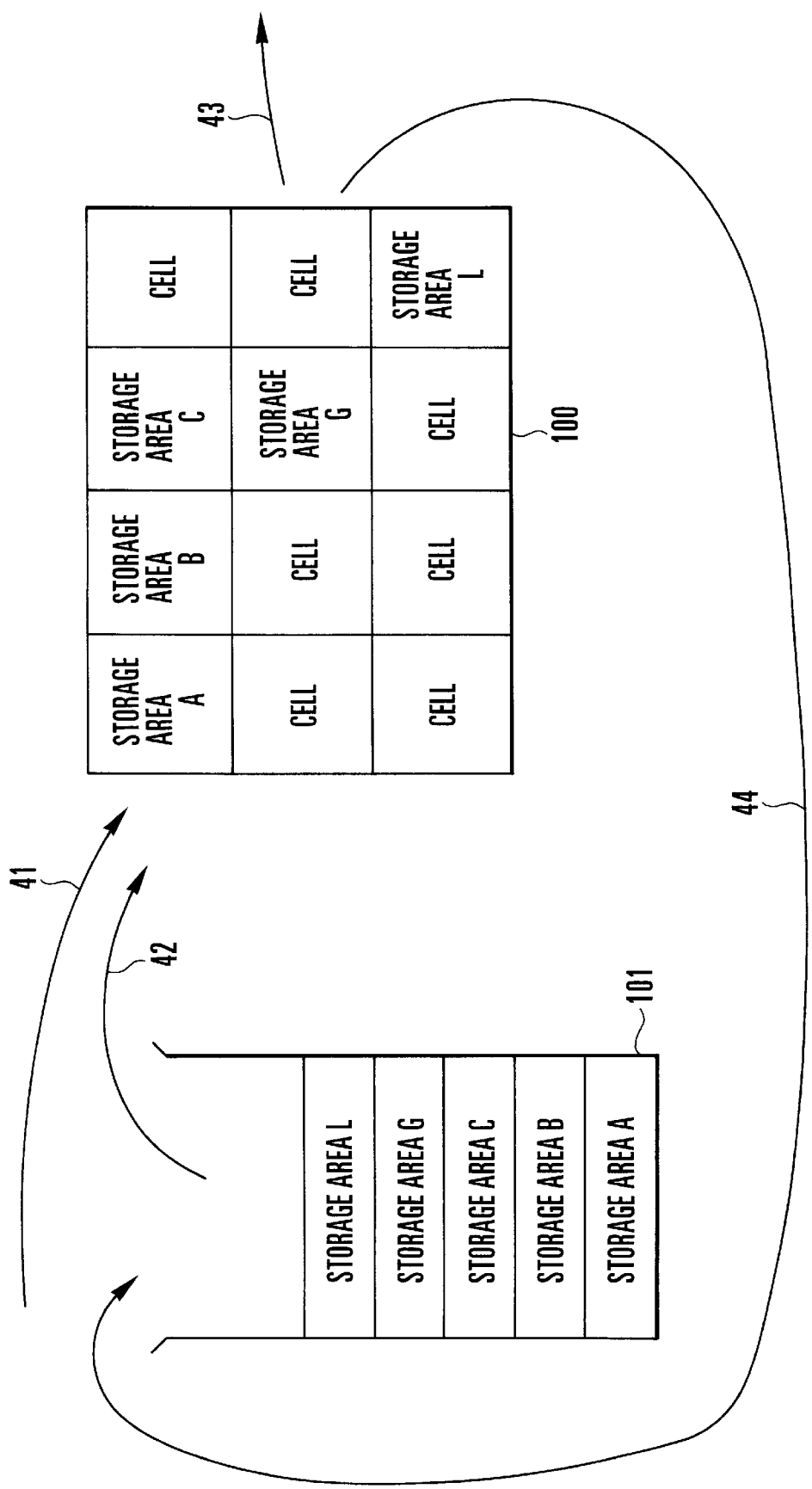
FIG. 5 is a view showing the structure of a cell data storage memory shown in FIG. 1.
Figure 6:
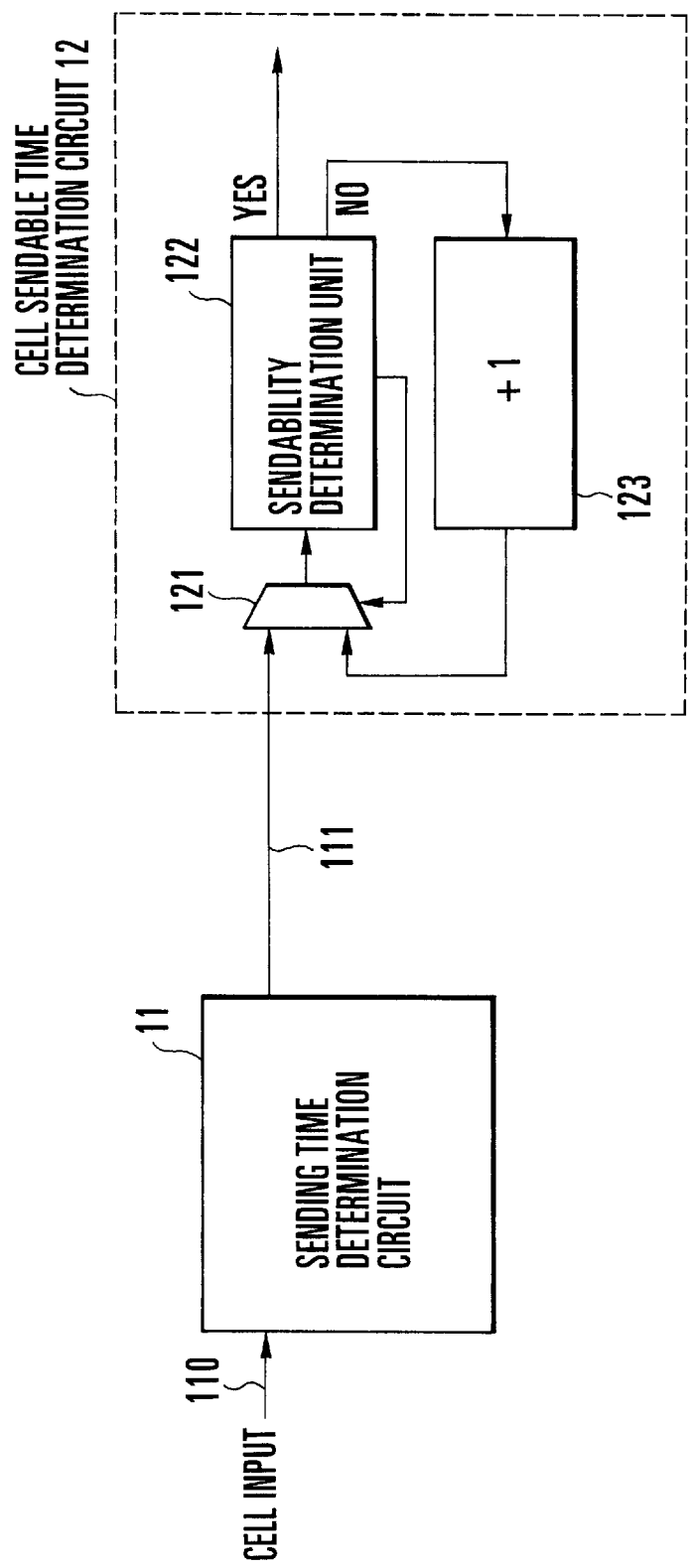
FIG. 6 is a block diagram showing the arrangement of a conventional ATM cell sending system.

The structure of the cell data storage memory 1 shown in FIG. 1 will be described below with reference to FIG. 5. As shown in FIG. 5, the cell data storage memory 1 comprises an address management circuit 101 in addition to a memory device 100 and manages free addresses in the cell data storage memory. The method for managing the addresses will be described below.

When a cell has arrived, as indicated by an arrow 41, the management circuit 101 selects an address, as indicated by an arrow 42. With this operation, the cell data is stored at the selected address.

The memory device 100 has storage areas A to L. The storage areas A to C, G, and L are free, and cells are stored in other storage areas. The addresses for the free storage areas, (i.e., free addresses) are held in the management circuit 101 in the form of a stack.

When stored cell data is output, as indicated by an arrow 43, the address becomes free. The free address is input to the management circuit 101, as indicated by an arrow 44 and held in the form of a stack. When cell data is stored in the storage area A, the address representing the storage area A is input to the CAM control circuit 5 as the above-described address 30.

the management circuit 101 may hold free addresses not in the form of a stack but in the form of a list, as a matter of course.

As described above, according to this system, an address at which contents coincide with a retrieval key and is the first address after the retrieval start address can be more quickly retrieved, so that the cell can be sent at the earliest time after the ideal cell sending time.

In this embodiment, the CAM 4 has the retrieval circuit 14. Even when a general memory without any retrieval function is used as a memory for storing the address of cell data, and a retrieval circuit separated from the memory is used to retrieve the first free address in ascending order, the same system as described above can be realized.

As has been described above, according to the present invention, designation of a retrieval start address is enabled in addition to the general retrieval function of the CAM. Moreover, the addresses of the CAM correspond to cell sending times. Therefore, the cell can be sent at the earliest time after the ideal cell sending time.

What is claimed is:

1. An asynchronous transfer mode (ATM) cell sending system comprising:
   a first memory for temporarily storing an input cell at a cell storage address of said first memory and outputting said cell storage address;
   a second memory for storing said cell storage address of said first memory at an address of said second memory and outputting said cell storage address from said address of said second memory to the input of said first memory wherein said first memory reads out the cell stored at said cell storage address in response to the input of said cell storage address;

retrieval means for retrieving from said second memory a first free address of said second memory after an address corresponding to an ideal cell sending time for said input cell; and memory control means for writing said cell storage address of said first memory at said free address of said second memory, wherein said free address is retrieved by said retrieval means, and reading out a cell storage address of said first memory from an address of said second memory which corresponds to a current time.

2. The system according to claim 1, further comprising:

cell sending time determination means for determining an ideal cell sending time as the reservation time for cell sending in response to input of the cell; and conversion means for converting the ideal cell sending time from said cell sending time determination means into a corresponding address of said second memory, and wherein said retrieval means retrieves the free address of said second memory after the ideal cell sending time by using the address from said conversion means as the start address.

3. The system according to claim 1, wherein said memory control means writes at an address of said second memory a reservable pattern to denote a free address of said second memory, and said retrieval means retrieves the free address of said second memory on the basis of the reservable pattern.

4. The system according to claim 1, wherein respective addresses of said second memory correspond with ascending cell sending times.

5. The system according to claim 1, wherein said second memory comprises a contents addressable memory (CAM) capable of designating a retrieval start address.

6. The system according to claim 5, wherein said retrieval means comprises a retrieval circuit for retrieving all free addresses of said CAM, an extraction circuit for extracting, from the free addresses retrieved by said retrieval circuit, free addresses after the retrieval start address, and a selection circuit for selecting a free address closest to the retrieval start address from the free addresses extracted by said extraction circuit.

7. The system according to claim 1, wherein said first memory has a management circuit for managing free addresses of said first memory, storing an input cell at one of the free addresses, and outputting the address at which said input cell is stored to said second memory.

* * * * *